Figure 1:
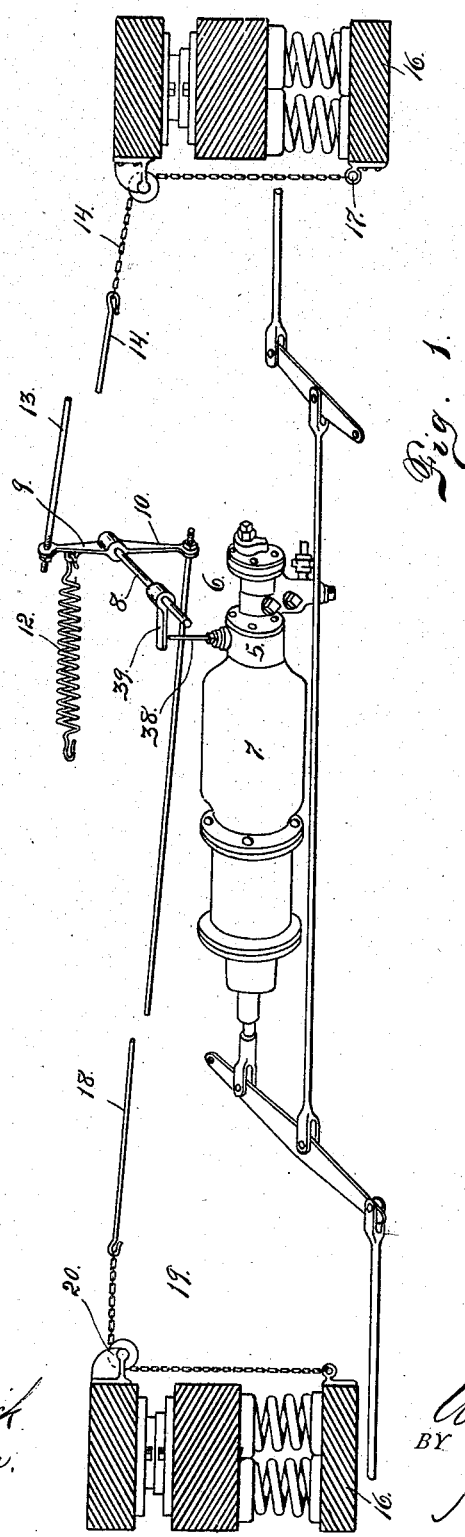

No. 717,286. Patented Dec. 30, 1902.
W. H. SAUVAGE.
FLUID BRAKE MECHANISM.
(Application filed Mar. 29, 1902.)

(No Model.) 2 Sheets—Sheet 1.

WITNESSES: INVENTOR.
Wm. H. Sauvage.
BY
ATTORNEY.

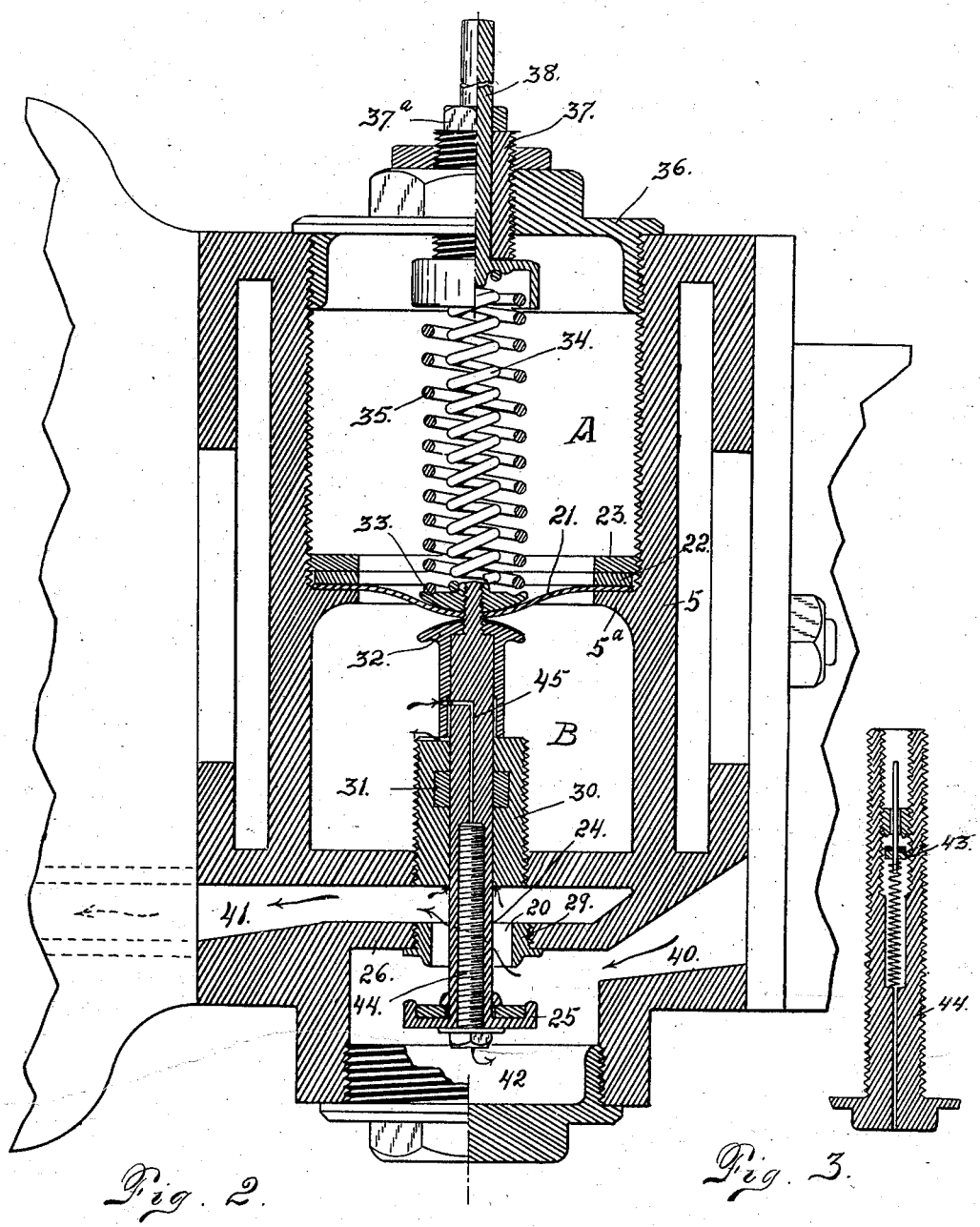

UNITED STATES PATENT OFFICE.

WILLIAM H. SAUVAGE, OF DENVER, COLORADO, ASSIGNOR OF THREE-TWENTIETHS TO FREDERICK B. STEVENSON AND RICHARD McKNIGHT, OF DENVER, COLORADO.

FLUID-BRAKE MECHANISM.

SPECIFICATION forming part of Letters Patent No. 717,286, dated December 30, 1902.

Application filed March 29, 1902. Serial No. 100,637. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Fluid-Brake Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in fluid-brake mechanism, and more particularly to a governor-valve mechanism for use in connection therewith, whereby the braking force is regulated by and made properly proportionate to the gravity of the car or the load; and to this end the invention consists of the features, arrangements, and combinations hereinafter described and claimed, all of which will be fully understood by reference to the accompanying drawings, in which is illustrated an embodiment thereof.

In the drawings, Figure 1 is a perspective view, partly in section, illustrating my improvements. Fig. 2 is an enlarged vertical section taken through the governor-valve mechanism. Fig. 3 is a sectional view in detail of the check-valve in the main valve-stem shown on a larger scale.

The same reference characters indicate the same parts in all the views.

Let the numeral 5 designate the governor-valve casing, which is interposed between the triple valve 6 and the auxiliary reservoir 7 of an air-brake system, as the Westinghouse. Suitably journaled underneath the car is a rock-shaft or spindle 8, provided with crank-arms 9 and 10, projecting above and below the same, respectively. Connected with the arm 9 is a coil-spring 12, whose opposite extremity is secured to a suitable stationary support. Connected with the upper extremity of the crank-arm 9 is a rod 13, to whose opposite end is connected a chain 14, passing over a pulley 15 and connected at its lower extremity with a sand-board 16 at one end of the car, as shown at 17. The crank-arm 10 is connected by a rod and chain 18 and 19 with the sand-board 16 at the opposite end of the car, the chain or flexible part of the connection passing over a pulley 20.

The main chamber, inclosed by the casing 5, is divided by a flexible diaphragm or partition 21 into two compartments A and B. This diaphragm rests upon a ledge $5^a$, formed on the inner wall of the chamber. Engaging the diaphragm above this ledge is a loose washer 22, and above the washer 22 a washer 23 is screwed into the chamber, whose inner wall is threaded for the purpose. Hence the outer edge of the diaphragm is held securely in place between the ledge and the washers, while its central portion is free to vibrate as circumstances may require. Passing through the bottom of the chamber is a stem 24, to whose lower extremity is attached a valve 25. This stem also passes through an opening in a partition 26 below the bottom of the chamber, there being a space, forming a duct 27, between the chamber and the partition. Into an opening 28 in the last-named partition is screwed a bushing 29, forming a seat for the valve. Into the bottom of the chamber, around the valve-stem, is screwed a bushing 30, which projects upwardly into the compartment B, forming a guide for the stem. Surrounding the stem, within the bushing 30, is a loose packing 31 to prevent the air from passing too rapidly into the compartment B of the chamber. The upper extremity of the valve-stem is reduced and threaded, passing through an opening for the purpose in the central part of the diaphragm. Applied to the upper extremity of the stem below the diaphragm is a cap 32, while screwed upon the upper extremity of the stem above the diaphragm is a nut 33. This construction forms a fluid-tight joint around the stem where it passes through the diaphragm. Above the nut 33 and engaging the same are two coil-springs 34 and 35, one within the other. The upper extremity of the chamber above the compartment A is closed by a head 36, which is screwed thereinto. This head is provided with an interiorly-threaded opening into which is screwed a bushing 37, whose lower extremity protrudes into the compartment A. This bushing is provided with a plain or unthreaded opening through which passes a stem 38, whose lower extremity is enlarged and recessed from below to engage the upper extremity of the springs 34 and 35. The interior spring 35 projects above the exterior spring 34 and engages the stem 38 when only light pressure thereon is required, and when greater pressure is required to hold the valve 25 open the lower extremity of the stem 38 engages both springs, and the valve is held open by a correspondingly-increased tension. The lower extremity of the bushing 37 protrudes into the chamber and engages from above the shoulder or enlargement formed at the lower extremity of the stem 38. The upper extremity of this bushing is fashioned to receive a wrench, as shown at $37^a$, whereby the bushing may be screwed down against the shoulder of the stem to compress the springs against the diaphragm and hold the valve 25 normally open by any desired pressure. A crank-arm 39 on the rock-shaft 8 is in position when actuated by the spring 12 to bear against the upper extremity of the stem 38 and hold the valve 25 with added force, thus coöperating with the springs 34 and 35, whose tension alone is so regulated that the valve 25 will be closed when the fluid-pressure in the brake-cylinder is just sufficient to give the proper braking force for the car when empty. When the car is empty, the connections between the sand-board 16 and the opposite extremities of the car and the crank-arms 9 and 10 of the rock-shaft 8 are held taut with sufficient force to stretch the spring 12 and hold the arm 39 away from the stem 38. When, however, the car is loaded, its body will lower or settle by virtue of its spring-support sufficiently to slacken said connections and allow the spring 12 to recoil and act on the rock-shaft to cause the arm 39 to bear against the stem 38 and hold the valve 25 open until the fluid-pressure in the brake-cylinder is sufficient to give a braking force proportionate to the gravity of the load. Hence the braking force is always automatically maintained properly proportionate to the gravity of the load or the weight of the car whether empty or loaded, thus avoiding flat wheels.

By having a connection between the rock-shaft and each end of the car vibration of the rock-shaft is practically prevented. Cars when in motion are subjected to an endwise rocking movement of greater or less magnitude, depending upon the condition of the track and road-bed. As one end of the car goes down the connection leading thereto will slacken, and if this were the only connection with the rock-shaft the latter would be subjected to a vibratory movement with the rise and fall of the car extremity; but when by virtue of the construction described one connection slackens the other will be held taut, since the opposite end of the car will remain in an elevated position—hence the function subserved by the double connection with the rock-shaft.

Attention is called to the fact that in case the load is all placed in one end of the car, so that only that end descends, the rock-shaft will still be held by the connection extending to the opposite end of the car. Consequently the rock-shaft arm 39 will fail to act on the stem 38 and the tension of the springs 34 and 35 will not be increased. In this event the normal tension of these springs when regulated for an empty car will remain unchanged. Were it not for this fact the wheels located under the empty end of the car might be locked and caused to slide by the undue braking force resulting from the load. This feature—namely, the two connections leading from the rock-shaft to the opposite ends of the car—therefore prevents the sliding of the wheels by reason of the load being placed at one end thereof. In case a bolster breaks under one end of the car the connection leading to the opposite end of the car will still maintain the rock-shaft in its inactive position and prevent the setting of the brakes and the sliding of the wheels. Hence it is evident that the rock-shaft cannot act to increase the tension of the valve-opening springs 34 and 35 unless the body of the car moves downwardly substantially in a horizontal plane, or, in other words, unless both ends of the car are forced downwardly by the load, and in case one end of the car is forced downwardly farther than the other the tension of the springs 34 and 35 will only be increased in proportion to the downward movement of the more elevated end of the car, thus preventing an undue application of braking force under all circumstances.

When the valve 25 is open, if an application of air is made to set the brakes the fluid passes from the triple valve by way of a duct 40 up through the opening 28 and thence through a duct 41 to the brake-cylinder until the braking force is sufficient for the load. As soon as this occurs the fluid which has squeezed around the valve-stem, where it passes to the governor-chamber, enters the compartment B and, acting on the diaphragm 21, raises the latter against the springs 34 and 35 sufficiently to close the valve 25 and cut off the passage of air to the brake-cylinder. When the brakes are released, the air-pressure in the chamber 42, below the valve 25, is reduced, and a check-valve 43, located in a stem 44, screwed into the valve-stem 24 from below, opens downwardly by virtue of the excessive pressure in the compartment B. The fluid in this event reaches the valve 43 through a passage 45 in the stem 24. Hence the fluid escapes from the compartment B in this manner, allowing the valve 25 to open by virtue of the spring-pressure above the diaphragm 21. As soon as the valve 25 opens the fluid escapes from the brake-cylinder, releasing the brakes.

The subject-matter covered by claims 1, 2, and 3 of the present application is shown but not broadly claimed in my previous application filed February 8, 1901, Serial No. 46,573.

Having thus described my invention, what I claim is—

1. In brake mechanism, the combination of a valve interposed between the pressure source and the brake-cylinder, a spring normally holding said valve open, a stem arranged when actuated, to increase the tension of said spring, a device arranged to engage said stem, a spring connected with said device and having a tendency to cause it to act on the stem and increase the tension of the spring which holds the valve open, and a flexible connection between the said device and the body of the car, and arranged to be held taut by the car-body when the car is empty, and also arranged to slacken and allow the spring connected with the device to cause the latter to actuate its engaging stem, as the spring-supported car-body descends in response to the weight of the load.

2. In fluid-brake mechanism, the combination of a valve interposed between the pressure source and the brake-cylinder, a spring normally holding said valve open, a stem connected with said spring, a device arranged to engage said stem, a spring connected with said device and having a tendency to cause it to act on the stem to increase the tension of the spring which holds the valve open, and a connection between the said device and the spring-supported car-body, whereby the said device is held inactive against the tension of its spring when the car is empty, and allowed to act in response to the spring as the gravity of the load increases.

3. In air-brake mechanism, the combination of a valve interposed between the pressure source and the brake-cylinder, a spring normally holding said valve open, spring-actuated means having a normal tendency to increase the tension of the valve-opening spring, and two connections between said tension-increasing means, the said connections extending in opposite directions toward the respective ends of the car, guides mounted on the body of the car and engaged by said connections which extend downwardly and are attached to stationary supports below the springs, whereby as the car rocks and either connection is slackened, the other connection will remain taut and obviate vibration of the tension-increasing means.

4. In air-brake mechanism, the combination of a valve interposed between the pressure source and the brake-cylinder, a spring normally holding said valve open, a stem connected with said spring, a rock-shaft provided with an arm arranged to engage said stem, a spring connected with another arm on said rock-shaft and having a tendency to cause the stem-engaging arm to act on the stem to increase the tension of the spring which holds the valve open, and a connection between the spring-held arm of the rock-shaft and the spring-supported body of the car, whereby the spring-held arm of the rock-shaft is held inactive against the tension of its spring when the car is empty and allowed to act in response to the spring as the gravity of the load increases.

5. In air-brake mechanism, the combination of a valve interposed between the pressure source and the brake-cylinder, a spring normally holding said valve open, a stem connected with said spring, a rock-shaft having three arms, a spring connected with one arm and normally holding another arm against the stem to increase the tension of the valve-opening spring, and connections extending from the spring-held arm of the rock-shaft and one of the other arms, and extending in opposite directions toward the respective ends of the car, guides mounted on the body of the car and engaged by said connections which extend downwardly and are attached to stationary parts below the car-springs, whereby as the car rocks and either connection is slackened, the other connection will remain taut and obviate vibration of the tension-increasing means.

6. In a fluid-pressure brake system, the combination with a chamber, of a spring-pressed flexible diaphragm fast therein, a stem secured to said diaphragm and projecting through an opening in the end of the chamber, ducts beneath said cylinder and a valve operated by said diaphragm to close the passage through said ducts when a predetermined quantity of fluid squeezes into the chamber between the opening in the end thereof and the stem of the diaphragm.

7. In a fluid-pressure brake system, the combination with a chamber located in the passage of the fluid to the brake-cylinder, the chamber having an opening in one end of just sufficient size to permit the movement of a stem, a flexible diaphragm fast in said chamber, a sleeve secured to said diaphragm and projecting through an opening in the end of the chamber, ducts below the chamber for the passage of fluid to the brake-cylinder, said ducts communicating with the opening in said chamber, a valve carried by said diaphragm-stem, and adapted to close the fluid-passage to the brake-cylinder when the central flexible portion of the diaphragm is raised by the fluid squeezing between the stem of the diaphragm and the end of the chamber.

8. In a fluid-brake system, the combination with a chamber closed at both ends, and provided with a fluid-passage below one end thereof to the brake-cylinder, a flexible diaphragm fast in said chamber, a stem secured to the vibrating portion of said diaphragm and projecting through an opening in one end of the cylinder and practically filling said opening, and a valve operated by said stem to close the fluid-passage when the diaphragm is moved by fluid forcing its way into the cylinder around the diaphragm-stem.

9. In a fluid-brake system, the combination with a chamber closed at both ends, having a spring-pressed diaphragm fast therein, mechanism operated by the gravity of the car for regulating the tension of said spring, ducts for the passage of fluid to the brake-cylinder, communicating with one end of said chamber, a stem secured to the flexible portion of said diaphragm and projecting through an opening in the end of the chamber, and a valve carried by the diaphragm-stem and adapted to close the passage through the ducts when a sufficient quantity of fluid has squeezed into the chamber around the diaphragm-stem and moved the diaphragm.

10. A governor for fluid-brake systems, consisting of a chamber to be located in the fluid-passage to the brake-cylinder, and having a spring-pressed flexible diaphragm fast in said chamber, a stem secured to the diaphragm and projecting through an opening in the end of the chamber and into the fluid-passage, and a valve operated by said diaphragm to close the passage when the pressure is sufficient to force an entrance into the chamber through an opening practically filled by the diaphragm-stem.

In testimony whereof I affix my signature in presence of two witnesses.

WILLIAM H. SAUVAGE.

Witnesses:
DENA NELSON,
A. J. O'BRIEN.